US008907282B2

(12) United States Patent
Pickett et al.

(10) Patent No.: US 8,907,282 B2
(45) Date of Patent: Dec. 9, 2014

(54) THERMAL IMAGING CAMERA WITH INTERMITTENT IMAGE CAPTURE

(75) Inventors: James T. Pickett, Santa Cruz, CA (US); Thomas Heinke, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 162 days.

(21) Appl. No.: 13/572,078

(22) Filed: Aug. 10, 2012

(65) Prior Publication Data

US 2014/0042319 A1   Feb. 13, 2014

(51) Int. Cl.
*G02F 1/01* (2006.01)

(52) U.S. Cl.
USPC ........................................... 250/330

(58) Field of Classification Search
USPC ........................................... 250/330
See application file for complete search history.

(56) References Cited

U.S. PATENT DOCUMENTS

| 7,471,334 | B1 | 12/2008 | Stenger |
| 7,693,679 | B1 | 4/2010 | Warnke et al. |
| 2009/0136091 | A1* | 5/2009 | Woodfill et al. ............ 382/106 |
| 2012/0071710 | A1* | 3/2012 | Gazdzinski .................. 600/101 |
| 2013/0335550 | A1* | 12/2013 | Rochenski et al. ............ 348/82 |

FOREIGN PATENT DOCUMENTS

| EP | 2034348 A1 | 11/2009 |
| EP | 2141530 A1 | 6/2010 |

OTHER PUBLICATIONS

Extended Search Report for EP Application 13179943.9 dated Feb. 27, 2014, 9 pages.
Machine Translation of Japanese Publication No. JP2004309719, translated Mar. 15, 2014; 78 pages.
James Gilbert, "PIR motion sensors for time-lapse photography"; retrieved from URL:http://labjg.wordpress.com/2012/05/05/pir-motion-sensors-for-time-lapse-photogaphy, 5 pages.

\* cited by examiner

*Primary Examiner* — David Porta
*Assistant Examiner* — Hugh H Maupin
(74) *Attorney, Agent, or Firm* — Fredrikson & Byron, P.A.

(57) ABSTRACT

A thermal imaging camera that intermittently captures thermal images of a scene for long term monitoring of the scene. The thermal images may be captured after each interval of a time delay interval and/or upon detection of a threshold change in thermal energy in the scene.

22 Claims, 7 Drawing Sheets

THERMAL IMAGING CAMERA WITH INTERMITTENT IMAGE CAPTURE

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Depending on the configuration of the camera, the thermal imaging camera may also generate a visible light image of the same object. The camera may display the infrared image and the visible light image in a coordinated manner, for example, to help an operator interpret the thermal image generated by the thermal imaging camera. Unlike visible light images which generally provide good contrast between different objects, it is often difficult to recognize and distinguish different features in a thermal image as compared to the real-world scene. For this reason, an operator may rely on a visible light image to help interpret and focus the thermal image.

In some situations, the thermal imaging camera may need to monitor a machine or process for lengthy periods of time. For example, it might be desirable to continuously monitor equipment or other objects for temperature changes, but such changes may occur only infrequently and/or very gradually and slowly. While such changes can be detected by continuous monitoring, such continuous monitoring over the long periods of time needed to detect the temperature changes consumes large amounts of memory as well as power, limiting the capacity of the thermal imaging camera.

SUMMARY

In general, this disclosure is directed to a thermal imaging camera that intermittently captures infrared images for long term monitoring of a scene.

Certain embodiments of the invention focus on a method of monitoring a temperature of a scene using a thermal imaging camera, including inputting an amount of a time delay interval into a delay timer of the camera and capturing an infrared image of the scene after each delay interval.

Certain embodiments of the invention include a method of monitoring a temperature of a scene using a thermal imaging camera, including selecting a temperature threshold on the camera, capturing an infrared image of the scene, detecting a thermal energy of the scene and capturing infrared images of the scene when the thermal energy of the scene changes by the threshold amount.

Certain embodiment of the invention may also include the use of a frame buffer that holds, in a rolling manner, several seconds of infrared images of the scene. When the thermal energy of the scene changes by a threshold amount, the infrared camera may capture infrared images of the scene from the frame buffer. In some embodiments, the captured images may be those both before and after the scene changes by a threshold amount.

In certain embodiments, mpeg encoder blocks of a system on chip may be used to detect threshold changes in the thermal energy of the scene.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene, including an object or objects, under observation. The thermal imaging camera may detect infrared radiation given off by the scene and convert the infrared radiation into an infrared image indicative of the heat patterns. In some embodiments, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Various embodiments provide methods and systems for capturing intermittent infrared images of a scene in a prescribed manner using a thermal imaging camera. These intermittent images may be combined in consecutive order to create a scrolling or streaming sequence of images or a dynamic image, similar to a time lapse video. By taking intermittent images in this way, temperature changes which occur slowly can be detected more easily and efficiently. In some embodiments, the thermal imaging camera will power down some or all of its components between capturing the intermittent images in order to conserve power. In some embodiments, the timing of the intermittently captured infrared images is regular, at predetermined intervals which may be set by the operator using a delay timer, for example. In other embodiments, the images are intermittently captured by the thermal imaging camera when a certain temperature or temperature change, which is greater than a threshold temperature, temperature change, or rate of temperature change, is detected. In still other embodiments, the thermal imaging camera periodically monitors the scene at intervals that may be set by the operator, at which time an infrared image is captured only if a temperature or temperature change which is greater than the threshold is detected. In some embodiments, the thermal imaging camera buffers frames of infrared images of the scene in a short-term rolling buffer such that the capture of infrared images may be from the rolling buffer and may include frames of the scene both before and after the threshold change is detected. In certain embodiments, the delay between captured images allows for less use of thermal imagining camera memory and can also allow for less power consumption. In these ways, the monitoring of a scene for temperature changes can be spread over a longer period of time than continuous image capturing for a particular amount of energy and memory consumption, which is particularly useful for detecting very slow temperature changes.

Figure 1:
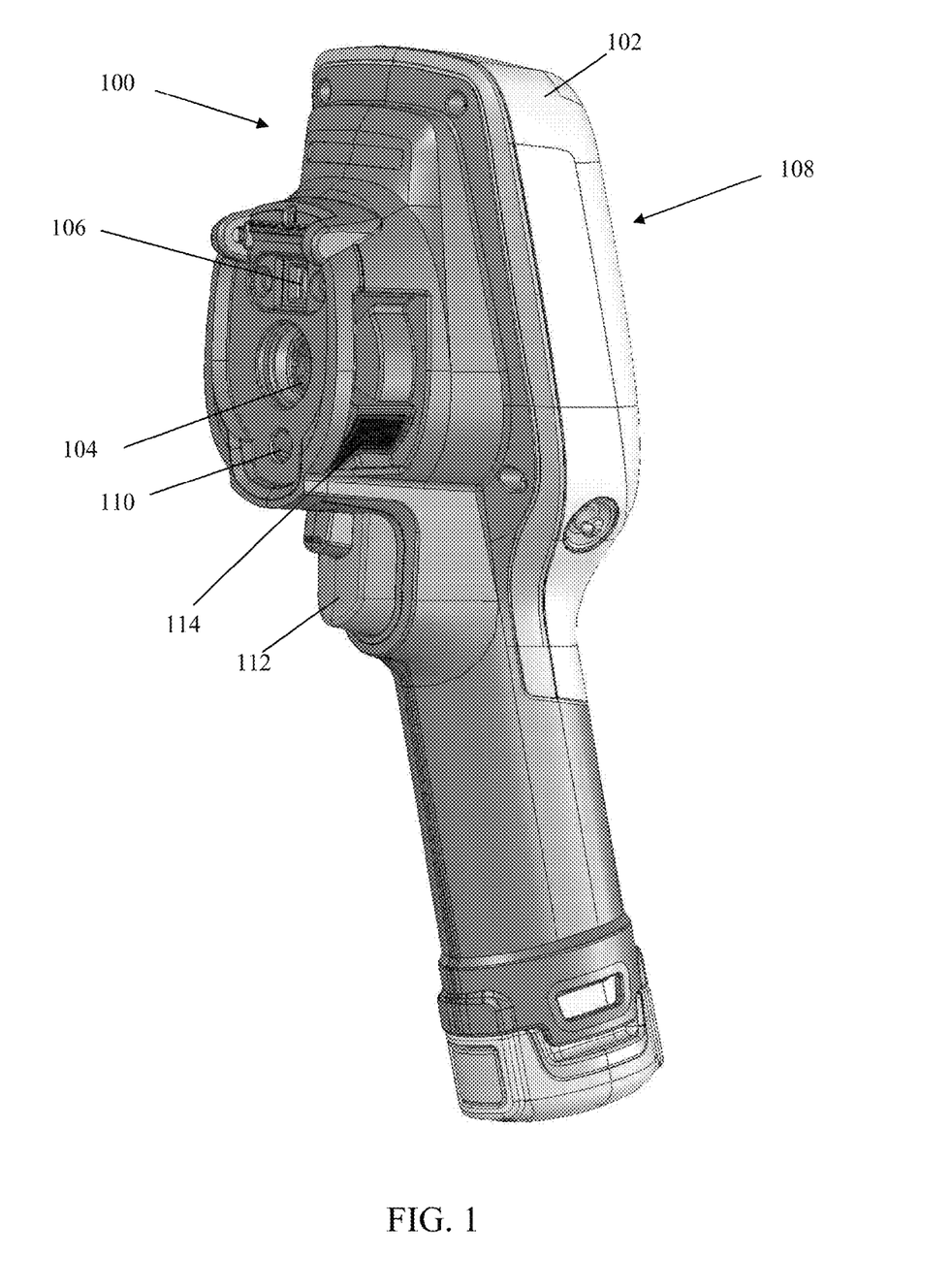
FIG. 1 is a perspective front view of a thermal imaging camera according to some embodiments.
Figure 2:
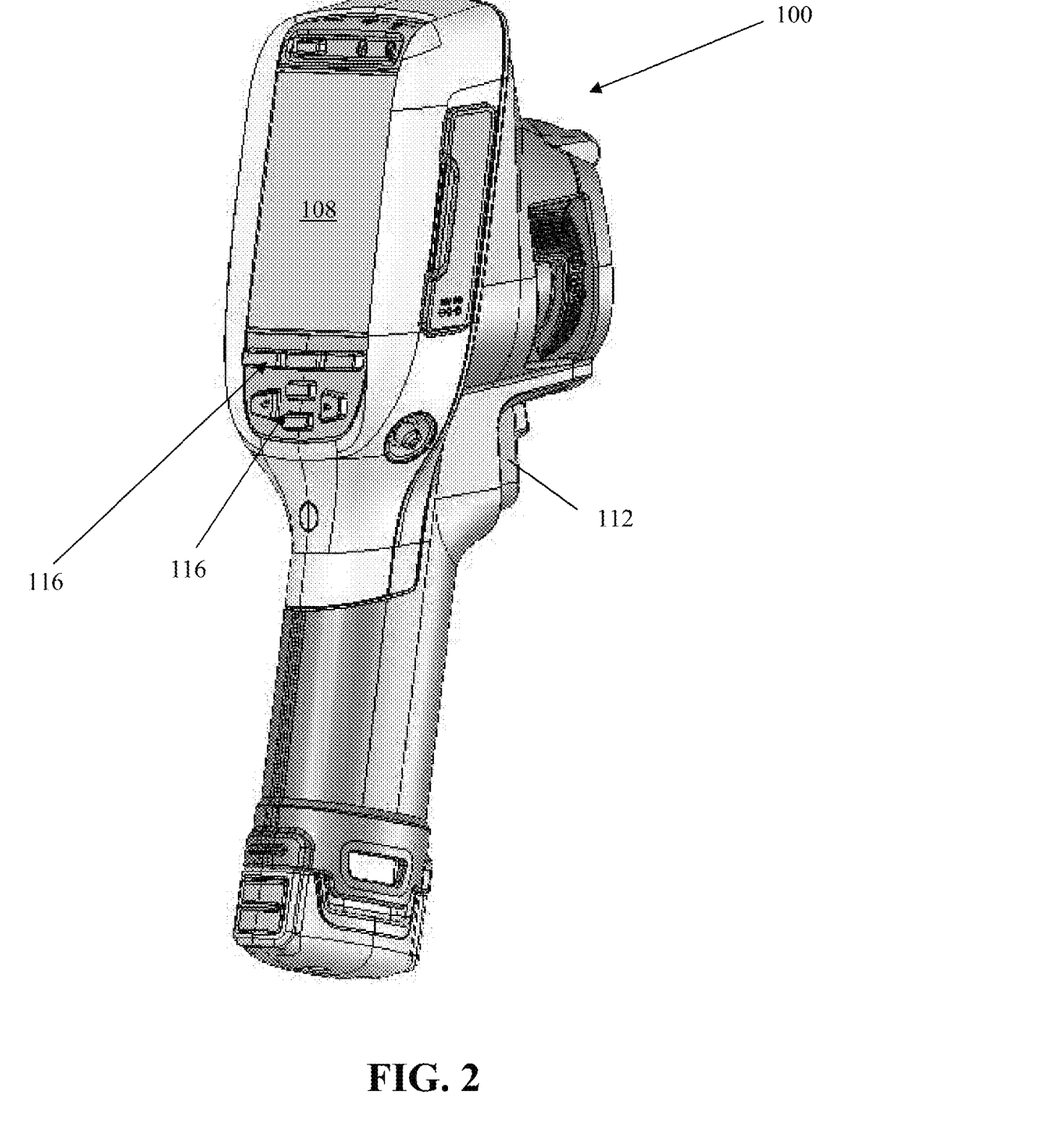
FIG. 2 is a perspective back view of the thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

Data of the distance-to-target, as measured by the laser 110, can be stored and associated with the corresponding captured image. For images which are captured using automatic focus, this data will be gathered as part of the focusing process. In some embodiments, the thermal imaging camera will also detect and save the distance-to-target data when an image is captured. This data may be obtained by the thermal imaging camera when the image is captured by using the laser 110 or, alternatively, by detecting the lens position and correlating the lens position to a known distance-to-target associated with that lens position. The distance-to-target data may be used by the thermal imaging camera 100 to direct the user to position the camera at the same distance from the target, such as by directing a user to move closer or further from the target based on laser measurements taken as the user repositions the camera, until the same distance-to-target is achieved as in an earlier image. The thermal imaging camera may further automatically set the lenses to the same positions as used in the earlier image, or may direct the user to reposition the lenses until the original lens settings are obtained.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a combined image that is a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
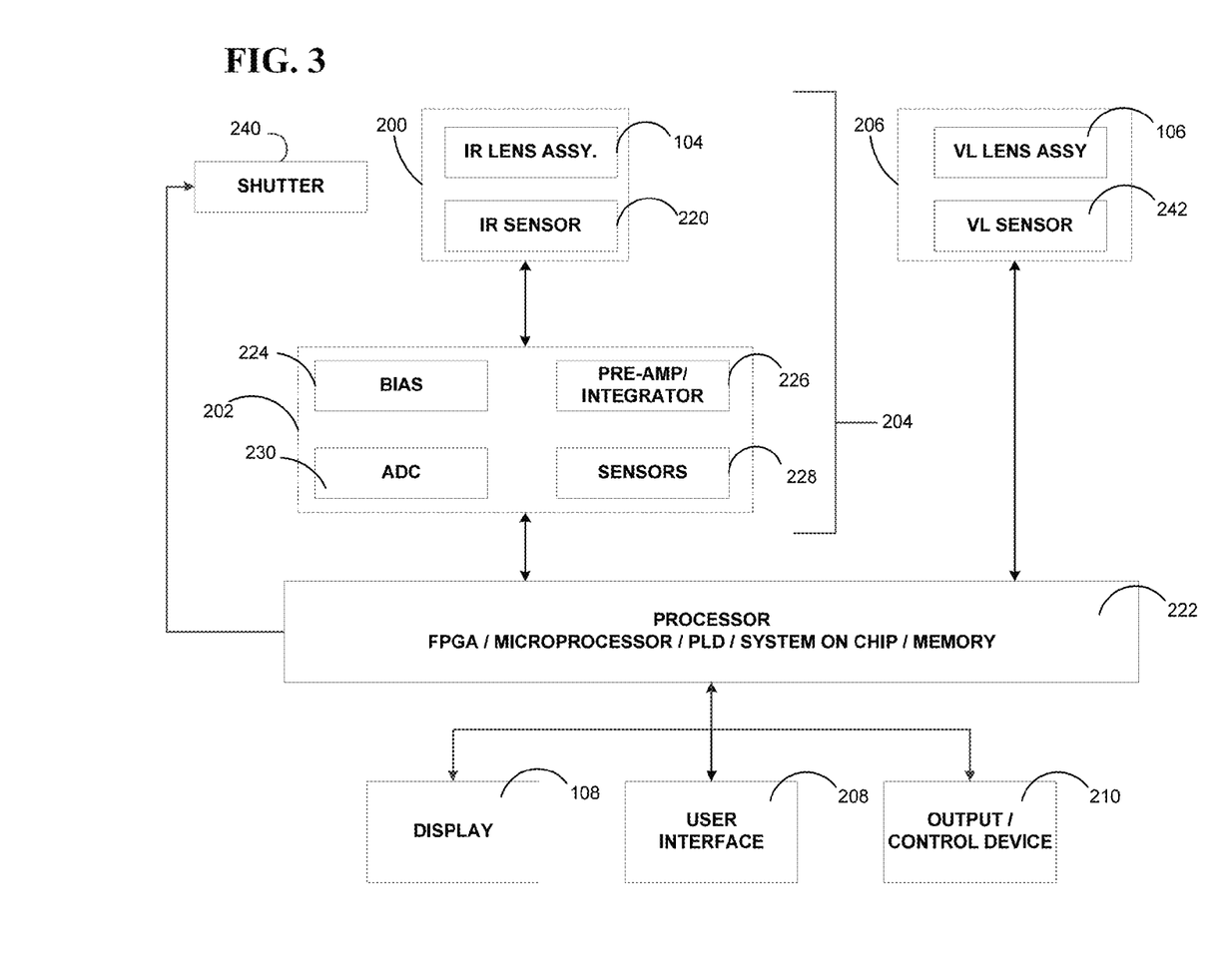
FIG. 3 is a functional block diagram illustrating components of thermal imaging cameras according to some embodiments.
Figure 4:
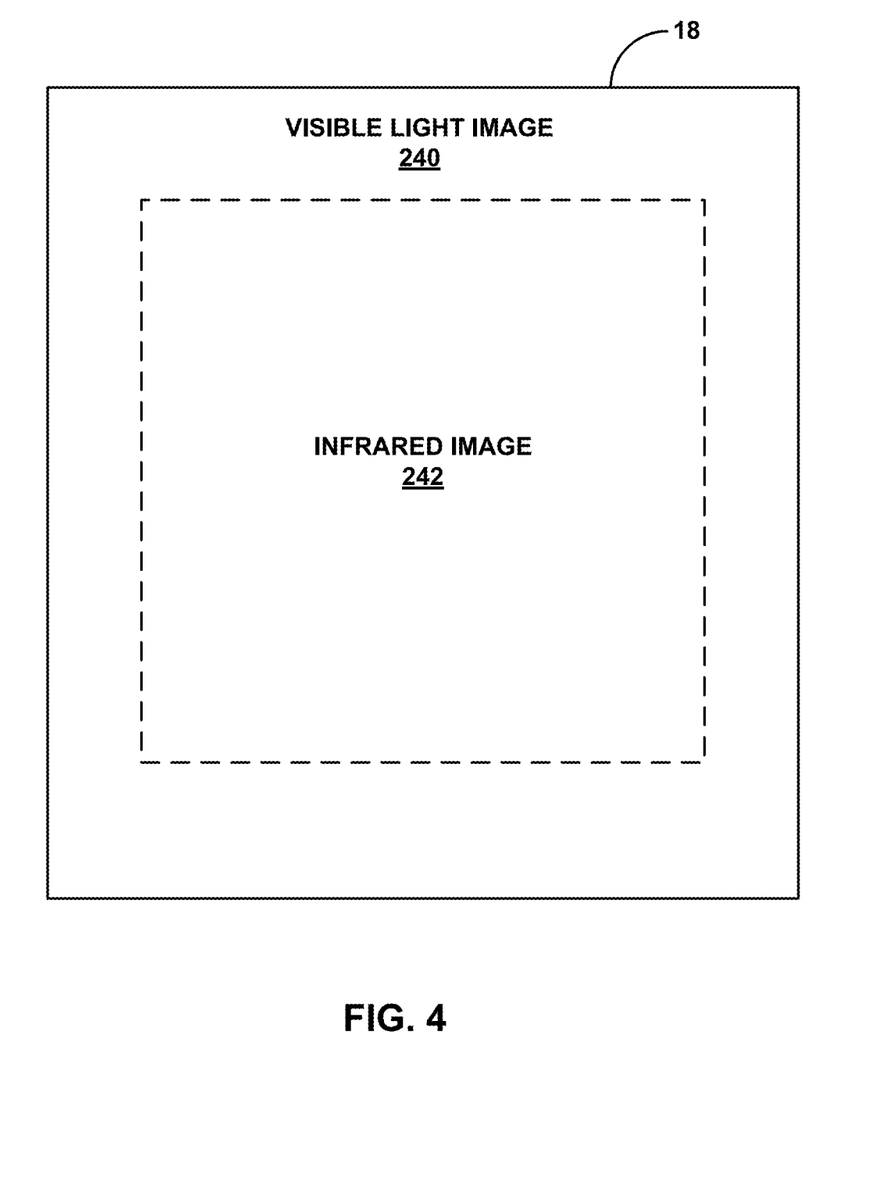
FIG. 4 is a conceptual illustration of an example of a picture-in-picture type concurrent display of a visual image and an infrared image.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared lens assembly 104 can have a variety of different configurations. In some examples, infrared lens assembly 104 defines a F-number (which may also be referred to as a focal ratio or F-stop) of a specific magnitude. A F-number may be determined by dividing the focal length of a lens (e.g., an outermost lens of infrared lens assembly 104) by a diameter of an entrance to the lens, which may be indicative of the amount of infrared radiation entering the lens. In general, increasing the F-number of infrared lens assembly 104 may increase the depth-of-field, or distance between nearest and farthest objects in a target scene that are in acceptable focus, of the lens assembly. An increased depth of field may help achieve acceptable focus when viewing different objects in a target scene with the infrared optics of thermal imaging camera 100 set at a hyperfocal position. If the F-number of infrared lens assembly 104 is increased too much, however, the spatial resolution (e.g., clarity) may decrease such that a target scene is not in acceptable focus.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160 or 650×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g. 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the thermal imaging camera 100.

In some embodiments, the front end circuitry 202 can include one or more additional elements for example, additional sensors 228 or an ADC 230. Additional sensors 228 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 220 to assist in radiometry calculations. A magnetic sensor, such as a Hall effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter xx can be externally or internally located relative to the lens xx and operate to open or close the view provided by the IR lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before thermal imaging camera 100 is used in another application. Processor 222 may also be implemented as a System on Chip that integrates all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at a given point in time.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 206. Visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242. As described above with respect to FIGS. 1 and 2, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108.

Visible light sensor 242 may include a plurality of visible light sensor elements such as, e.g., CMOS detectors, CCD detectors, PIN diodes, avalanche photo diodes, or the like. The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of thermal imaging camera 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of thermal imaging camera 100 a single time. By generating a frame of visible light data, processor 222 captures visible light image of a target scene at a given point in time. Processor 222 may also repeatedly measure the response of each visible light sensor element of thermal imaging camera 100 so as to generate a dynamic thermal image (e.g., a video representation) of a target scene, as described above with respect to infrared camera module 200.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by thermal imaging camera 100) or less than an entire visible light image (e.g., a lesser port of the entire target scene captured by thermal imaging camera 100).

As noted above, processor 222 may be configured to determine a distance between thermal imaging camera 100 and an object in a target scene captured by a visible light image and/or infrared image generated by the camera. Processor 222 may determine the distance based on a focus position of the infrared optics associated with the camera. For example, processor 222 may detect a position (e.g., a physical position) of a focus mechanism associated with the infrared optics of the camera (e.g., a focus position associated with the infrared optics) and determine a distance-to-target value associated with the position. Processor 222 may then reference data stored in memory that associates different positions with different distance-to-target values to determine a specific distance between thermal imaging camera 100 and the object in the target scene.

In these and other examples, processor 222 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In a combined arrangement, the visible light image and the infrared image may be superimposed on top of one another. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an example combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like.

Additionally, in some embodiments, the processor 222 can interpret and execute commands from user interface 208, an output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

Processor can further include other components to assist with the processing and control of the infrared imaging camera 100. For example, as discussed above, in some embodiments, an ADC can be incorporated into the processor 222. In such a case, analog signals conditioned by the front-end stages 204 are not digitized until reaching the processor 222. Moreover, some embodiments can include additional on board memory for storage of processing command information and scene data, prior to transmission to the display 108 or the output/control device 210.

An operator may interact with thermal imaging camera 100 via user interface 208, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale or amber. In other examples, display 108 is configured to display an infrared image in a color palette such as, e.g., ironbow, blue-red, or other high contrast color scheme. Combination of grayscale and color palette displays are also contemplated.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by thermal imaging camera 100.

Various embodiments may allow the operator to set a time interval between capturing images or between checking a scene for a temperature, temperature change, or rate of temperature change. The amount of this interval may be selected by the operator and input into a delay timer. The delay timer may functionality may be performed, for instance, by some or all of processor 222. The thermal imaging camera 100 may include a user interface 208 for controlling this function. In some embodiments, the thermal imaging camera 100 may allow an operator to input a temperature threshold, temperature change threshold, or rate of temperature change threshold into the camera 100, and the thermal imaging camera 100 may include a user interface 208 for controlling this function. In some embodiments, the time interval and/or threshold are input by navigating and controlling options visible on the display 108.

Various embodiments may include optionally putting the thermal imaging camera into a sleep mode in which the supply of power is discontinued to some but not all of the components of the thermal imaging camera and certain data in memory are maintained. For example, in some embodiments, such as embodiments which include a delay timer, the power may be discontinued to all components of the camera except the delay timer, and power may be re-supplied to the entire thermal imaging camera upon expiration of the delay timer interval. In some embodiments, such as embodiments in which the thermal imaging camera is in sleep mode while monitoring the scene for a temperature, temperature change, or rate of change greater than a threshold, the sleep mode may include temporarily discontinuing power to the display 108 and portions of or all of the processor 222. In some such embodiments, as noted above, the processor 222 is provided by and/or forms part of a system on chip. In certain embodiments that employ a system on chip, the system on chip may include MPEG encoder hardware blocks. In such embodiments, the sleep mode may include temporarily discontinuing power to parts of the processor 222, except for, for instance, the MPEG encoder blocks. Thus, at least the MPEG encoder blocks, and the front end components 204 of the infrared camera 100, can continue operation during sleep mode.

The operator may select the duration of the delay interval of the delay timer. Any delay desired may be selected by the operator, such as a few minutes or an hour or more. The length of the delay may depend on the speed with which temperature changes are expected to occur in the particular scene being monitored and/or on whether or not it is critical to detect such changes quickly.

In sleep mode in some embodiments, such as when the processor 222 comprises a system on chip with MPEG encoder hardware blocks, the front end components 204 of the infrared camera 100 can provide an output signal to the processor 222. Since the MPEG encoder blocks remain operational in sleep mode, the MPEG encoder blocks can continue to process the signals received. The compression scheme used by an MPEG encoder typically includes an analysis of an input signal for changes, such that the changes are encoded into an MPEG video stream. This same signal analysis performed by the MPEG encoder described in certain embodiments herein is used to monitoring the scene for a temperature, temperature change, or rate of change greater than a threshold. That is, the signal changes that are used by an MPEG compression scheme are also used to determine if the signal has changed beyond a threshold. When the MPEG encoder blocks detect that the signal has changed beyond a threshold, the MPEG encoder blocks may signal the thermal imaging camera 100 to exit sleep mode and capture an infrared image(s) of the current scene. A change beyond a threshold includes the concept of motion detection, such as when an object in the image scene moves in the scene (e.g., translates across the frame).

In some embodiments, infrared images that are captured intermittently, such as through the use of a time delay and/or temperature monitoring, may be saved together in a video format as a time lapse video of the scene. The resulting time lapse video stream of the captured infrared images appear to speed up time, thereby allowing temperature changes occurring very slowly to become visible. Such videos may be created in many different types of video formats, such as MPEG, or a radiometric format, such as IS3. In each instance when the infrared camera 100 intermittently captures infrared imagery, the infrared camera 100 may capture multiple successive frames. Such practice permits one to better visualize the changes in a target scene.

Figure 5:
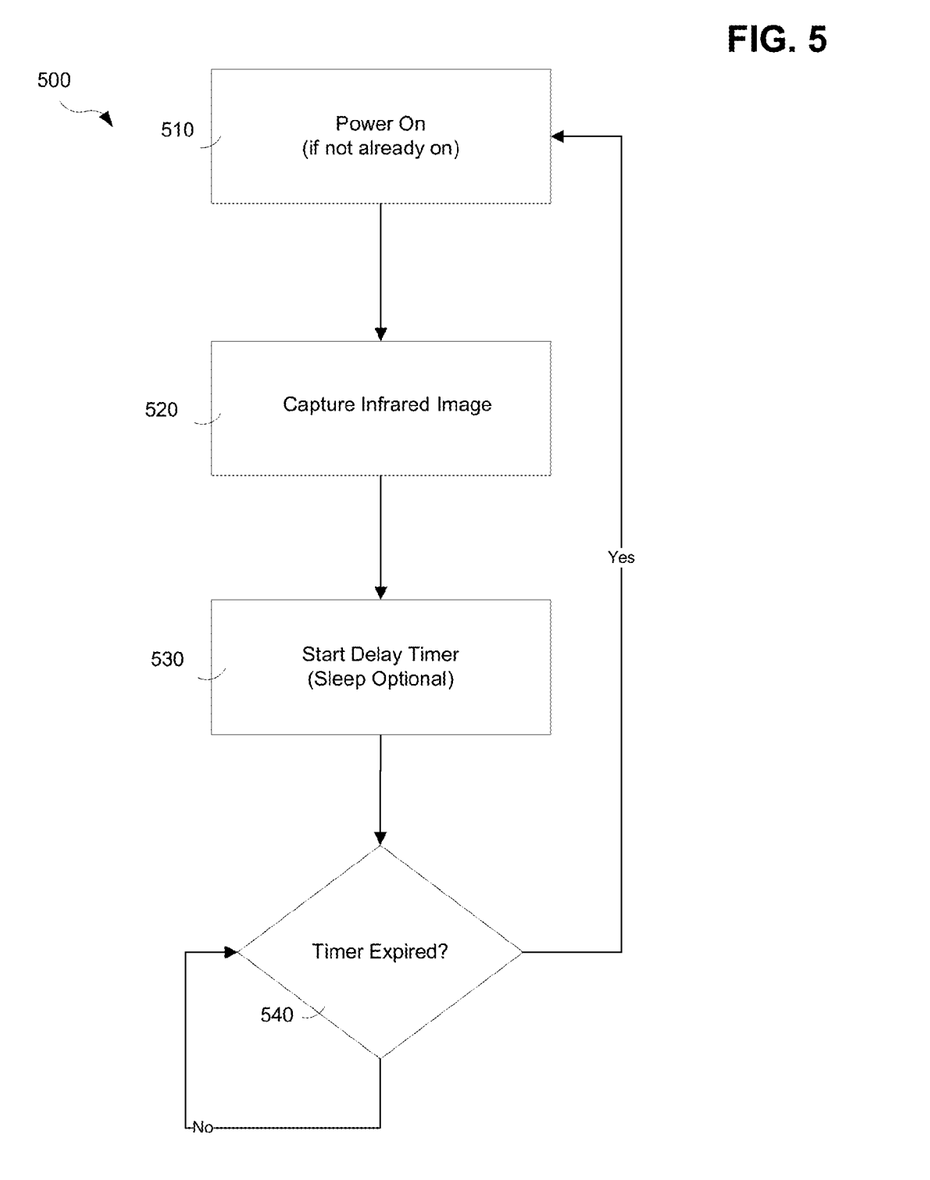
FIG. 5 is a flow chart of a process for capturing intermittent infrared images according to some embodiments.

Various embodiments are described below with reference to the processes shown in FIGS. 5-7. In each case, the thermal imaging camera 100 is either fixed in place to monitor a scene or is a mobile camera which is positioned in a location to monitor a scene and remains in that position throughout the process. FIG. 5 depicts a flow chart of a process for intermittently capturing infrared images using a thermal imaging camera 100. The process 500 includes step 510 in which the thermal imaging camera 100 is powered on (if the power is not already on). In step 520, an infrared image is captured (which may include capturing several frames of infrared images). Upon capturing the infrared image in step 520, a delay timer is started in step 530. The amount of time of the delay interval may have been input into the camera by the operator. In some embodiments, the thermal imaging camera 100 will also enter and remain in a sleep mode while the delay timer is running, during which time the supply of power is discontinued to various components of the thermal imaging camera 100. For example, the power supply may be discontinued to all components of the thermal imaging camera 100 except the delay timer. In other embodiments, the thermal imaging camera remains powered on throughout the delay interval of the delay timer. At step 540, if the camera 100 detects that the delay interval of the delay timer has not expired, it continues to wait in sleep mode. In some embodiments, the operator may have the option to select whether or not the camera 100 enters sleep mode during the delay interval. If the camera 100 detects the delay interval has expired, it will return to step 510 and power on the thermal imaging camera 100 (if the power was off or partially off while the thermal imaging camera was in sleep mode). The process then repeats such that a series of infrared images may be taken, separated in time by the delay interval.

Figure 6:
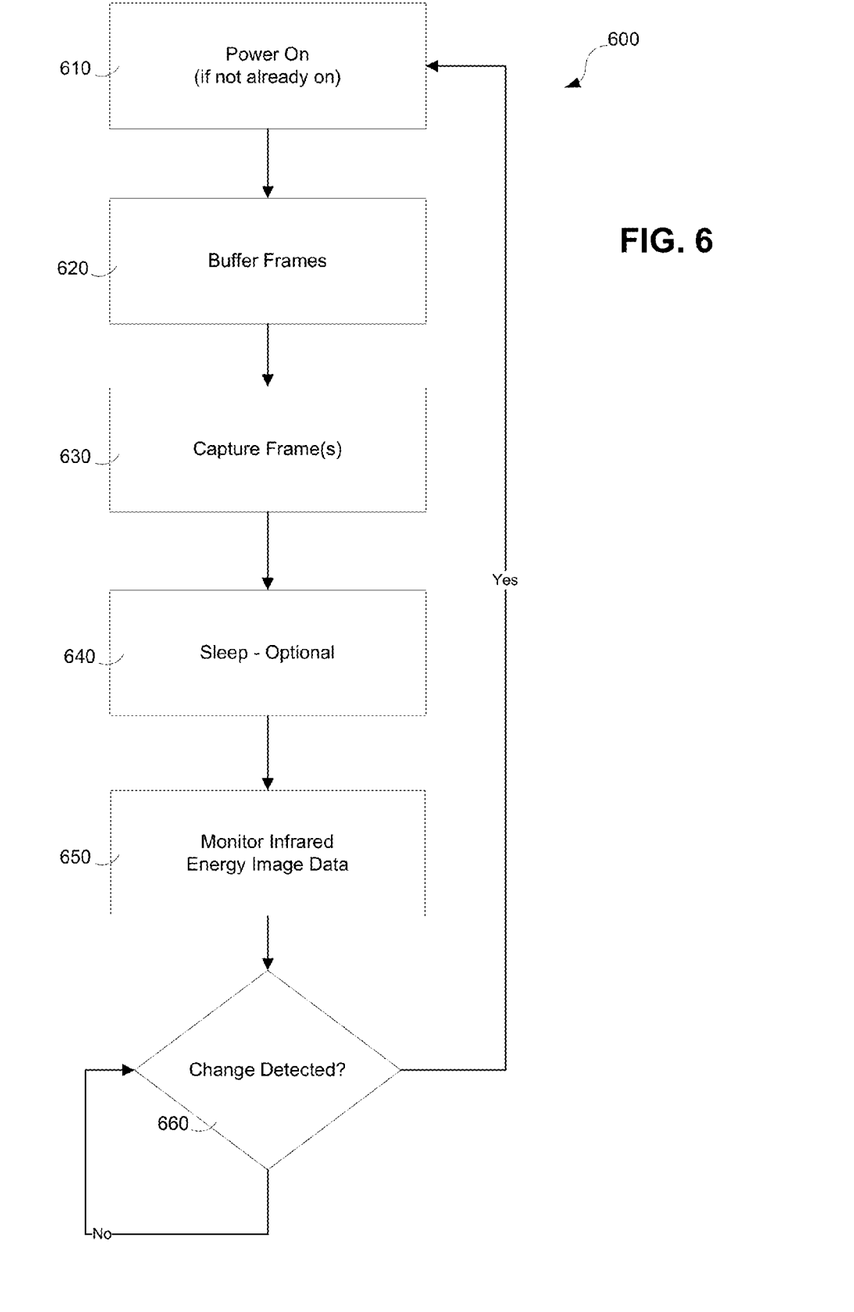
FIG. 6 is a flow chart of another process for capturing intermittent infrared images according to some embodiments.

An alternative embodiment is shown in FIG. 6. In this figure, the process 600 begins with step 610 in which the thermal imaging camera 100 is powered on (if not already on) such that the thermal imaging camera 100 is fully on. The thermal imaging camera 100 then buffers frames of infrared images of a scene in step 620. The processor 222 may contain and control the frame buffering functionality. For instance, the processor may contain a ring buffer or rolling buffer that holds a series of frames. In some embodiments, the buffer holds, in a rolling manner, frames of infrared images captured over a 30 second timeframe. In some embodiments, the buffer holds frames captured for over a 30 second timeframe. In some embodiments, the buffer holds frames capture over less than a 30 second timeframe. Step 620 is optional, though, in this embodiment. In step 630, the thermal imaging camera 100 captures an infrared image (which may include capturing several frames of infrared images) of the scene. The frame capture step 630 may be a capture of the frames in the rolling buffer. By doing so, the thermal imaging camera 100 can store frames of the scene both prior to and after a threshold change is detected (discussed below as step 660). Therefore, the intermittently captured images will show a progression of the scene from right before to after the threshold change occurred without also having to capture the images over all time. After capturing the infrared image(s) of the scene, the thermal imaging camera 100 may optionally enter a sleep mode in step 640 in which power to portions of the thermal imaging camera 100 may be discontinued. For instance, power may be cut to the portions of the camera not being used. Alternatively, the thermal imaging camera 100 may remain fully powered. In some embodiments, the operator may have the option to select whether or not the camera 100 enters a sleep mode. The thermal imaging camera 100 then monitors the infrared energy produced by the scene in step 650. If the thermal imaging camera 100 remains powered and is not in sleep mode, this step may be performed by the processor of the thermal imaging camera 100. If the thermal imaging camera 100 is in sleep mode, the next step may be performed by the active MPEG encoder blocks on the processor 222. In step 660, if a temperature or temperature change that is greater than the threshold temperature or temperature change is not detected, then the thermal imaging camera 100 continues to monitor the infrared energy of the scene. If a temperature or temperature change is detected which is greater than the threshold temperature or temperature change, then the thermal imaging camera 100 repeats the processes beginning at step 610 by powering on (if power is not already on), buffering frames at step 620, and capturing an infrared image in step 630. In this way, after the first or original infrared image, additional infrared images are captured if a temperature or temperature change is detected which is greater than a threshold. Moreover, the frames captured in step 630 may be frames that occurred following the threshold detection, and, optionally, before the threshold detection. The frames captured before the threshold detection may include some or all of the frames that have not yet rolled out of the frame buffer. Thus, to the extent the threshold detection was detection of an equipment glitch, the frame capture can then store the frames both before and after the equipment glitch. In embodiments that include frame buffering (step 620) and where either the sleep mode is not used or where the sleep mode continues to power the frame buffer, the frame buffer will likely still contain frames taken before the threshold detection occurred in step 660.

Figure 7:
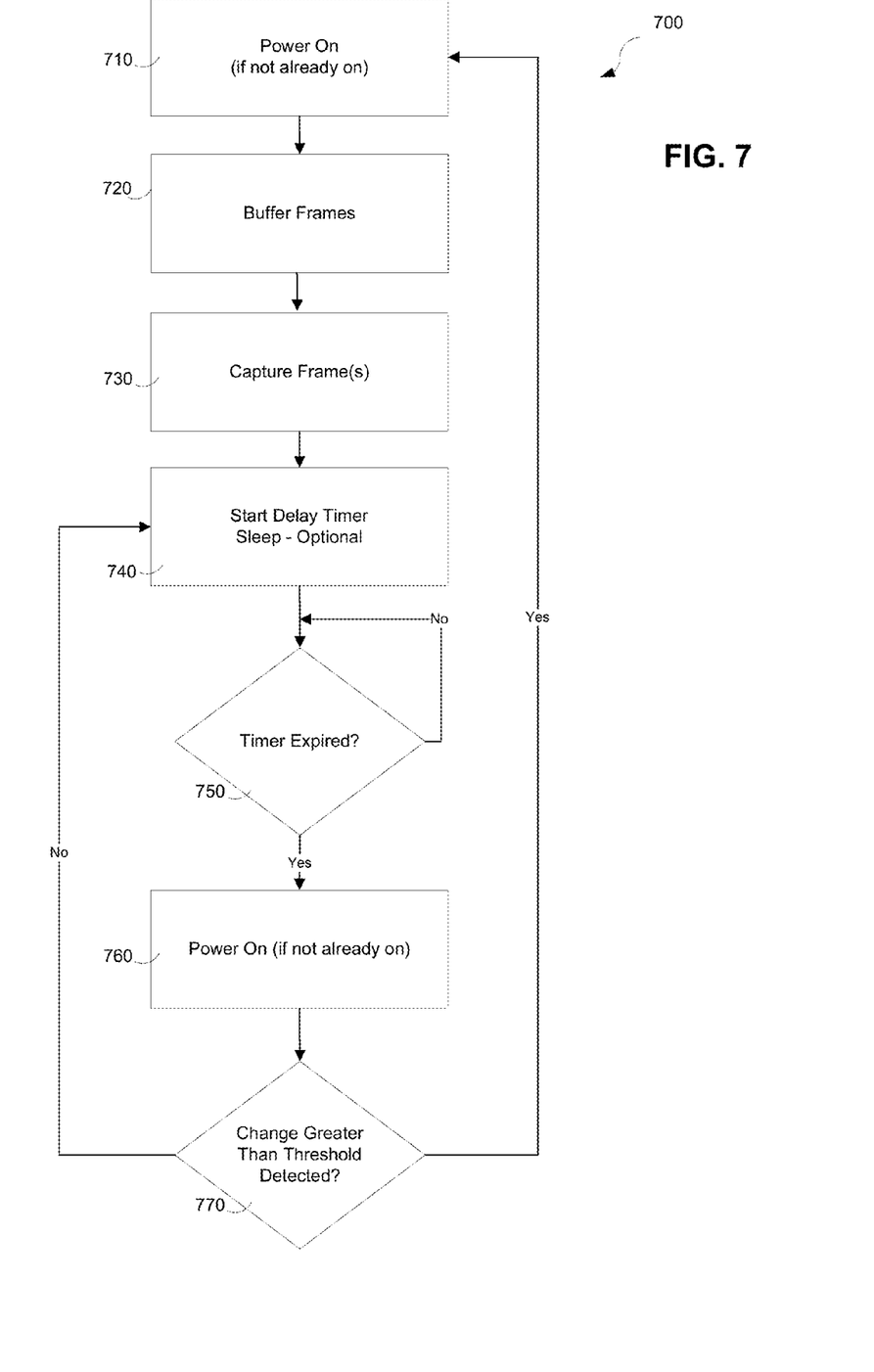
FIG. 7 is a flow chart of another process for capturing intermittent infrared images according to some embodiments.

Still another embodiment is shown in FIG. 7, which is a combination of the embodiments in FIGS. 5 and 6. In this embodiment, the process 700 includes powering on the thermal imaging camera 100 (if not already on) at step 710. The thermal imaging camera 100 then buffers frames of infrared images of a scene in step 720. The processor 222 may contain and control the frame buffering functionality. For instance, the processor may contain a ring buffer or rolling buffer that holds a series of frames. Step 720 is optional, though, in this embodiment. In step 730, the thermal imaging camera captures an infrared image (which may include capturing several frames of infrared images). The frame capture step 730 may be a capture of the frames in the rolling buffer. By doing so, the thermal imaging camera 100 can store frames of the scene both prior to and after a threshold change is detected (discussed below as step 770). After capturing the infrared image, a delay timer starts at step 740. The amount of time of the delay timer interval may have been input into the camera by the operator. The thermal imaging camera 100 may also enter a sleep mode at the start of the delay timer. The sleep mode may comprise power being discontinued to portions of the thermal imaging camera 100. Such portions may be all portions of the thermal imaging camera 100, except the delay timer, or to portions of the camera not being used. Such portions may instead be the display 108 and portions of the processor, except for MPEG blocks when the processor comprises a system on chip. In some embodiments, the operator may have the option to select whether or not the camera 100 enters a sleep mode. If the delay time period has not expired at step 750, the thermal imaging camera remains in delay mode (and optionally in sleep mode). If the delay time period has expired at step 750, the thermal imaging camera 100 powers on (if not already on) at step 760. The powering on in step 760 includes providing power to at least the components of thermal imaging camera 100 that are needed to perform the analysis in step 770. In step 770, the thermal imaging camera 100 checks whether a temperature or temperature change has occurred which is greater than a threshold. Thus, the power on in step 760 may include providing power to all components of thermal imaging camera, or at least to the front end 204 and to the MPEG encoder blocks in the system on chip. If no temperature change has occurred, or if the temperature or temperature change are less than a threshold, the thermal imaging camera 100 does not capture an infrared image but rather the delay timer is started again and, optionally, the thermal imaging camera reenters sleep mode, at step 740. This process repeats until a temperature or temperature change is detected that is greater than the threshold at step 770. When a temperature or temperature change is detected that is greater than a threshold, the thermal imaging camera 100 repeats the processes beginning at step 710 by powering on (if power is not already on), buffering frames at step 720, and capturing an infrared image in step 730. In this way, after the first or original infrared image, additional infrared images are captured if a temperature or temperature change is detected which is greater than a threshold. Moreover, the frames captured in step 730 may be frames that occurred following the threshold detection, and, optionally, before the threshold detection.

The frames captured before the threshold detection may include some or all of the frames that have not yet rolled out of the frame buffer. Thus, to the extent the threshold detection was detection of an equipment glitch, the frame capture can then store the frames both before and after the equipment glitch. In embodiments that include frame buffering (step 720) and where either the sleep mode is not used or where the sleep mode continues to power the frame buffer, the frame buffer will likely still contain frames taken before the threshold detection occurred in step 770. The delay timer then starts again in step 740 (and optionally the thermal imaging camera 100 enters sleep mode). Once the delay timer expires, the thermal imaging camera 100 again checks for a temperature or temperature change greater than the threshold and only captures an infrared image if such a temperature or temperature change has occurred. If such a temperature or temperature change has not occurred, the delay timer is restarted again. In this way, after the first or original infrared image, infrared images are only captured if a temperature or temperature change has occurred which is greater than a threshold, and the thermal imaging camera 100 only checks for the temperature or temperature change intermittently, depending on the duration of the time delay.

The threshold against which the temperature or temperature change is compared in steps 660 and 770, for example, may be set by the operator of the thermal imaging camera 100. The threshold may be a temperature value, such that when any portion of the scene exceeds the threshold temperature value, an infrared image is captured, but no infrared images are captured unless that threshold temperature value is reached. Alternatively, the threshold may be a temperature change, such that when the change in temperature exceeds the threshold temperature change amount, an infrared image is captured, but no infrared images are captured unless that threshold temperature change occurs. In some embodiments, the temperature change of the threshold may be either an increase or a decrease in temperature, while in other embodiments the threshold may be a temperature increase only. In some embodiments, the threshold temperature change is associated with the movement of an object in the scene. That is, the threshold detection, in some embodiments, is the detection of object movement in the imaged scene.

When the threshold against which the temperature of the thermal image is compared is a temperature value, it may be the maximum temperature of any point within the infrared image or within a selected portion of the infrared image, the average temperature value of the infrared image as a whole or of a selected portion of the infrared image as a whole, or the temperature of a specific point in the infrared image (which may be selected by the operator) which is used for the comparison.

Furthermore, when the threshold against which the temperature of the thermal image is compared is a change in temperature, the basis of comparison may be the most recent infrared image captured in steps 630 and 730, for example. Alternatively, the basis of comparison may be the most recent infrared image detected by the thermal imaging camera 100 in steps 660 and 770, for example. Furthermore, the comparison may be between the maximum temperature anywhere in the previous (captured or detected) image and the maximum temperature anywhere in the present detected image. Alternatively, the comparison may be between the average temperature of the previous (captured or detected) image and the average temperature in the present detected image. Moreover, in some embodiments, the comparison may be of whether an object in the imaged scene has moved (e.g., translated across the frame) between the images being compared. In some embodiments, the comparison is between the same portions of the images, such as between the same pixel of the previous (captured or detected) image and the present detected image. In such embodiments, a pixel to pixel comparison may be made between the previous image and the present image. In some embodiments, the threshold may be considered to be exceeded if the temperature change in any portion (such as any pixel) of the present image as compared to the same portion in the previous (captured or detected) image exceeds the threshold.

In some embodiments, the cycle of intermittent pictures continues indefinitely with no prescribed duration. In other embodiments, the operator may need to or may have the option to input a total duration for the process. The duration may be in units of time (such as minutes, hours or days) or may be in number of captured infrared images or the time length of the compilation of images captured. The thermal imaging camera 100 may continue intermittently monitoring a scene and/or capturing infrared images until the duration expires, at which time the thermal imaging camera 100 may discontinue the process and may also power off.

Embodiments described herein may be used to monitor a scene for an extended period of time using a thermal imaging camera 100 by taking infrared images only intermittently. This may be useful for monitoring equipment such as machines in a factory or production line or for monitoring products on a conveyor. In some embodiments, it may be used to detect termite damage, such as hidden damage within a wall of a building or home. Termites may cause loss of drywall, wood or other materials within the wall. Various embodiments may be used to detect such damage using a thermal imaging camera 100. The thermal imaging camera 100 may be positioned to monitor a scene, such as an interior or exterior wall of a building or home suspected of having termite damage. The ambient temperature of the room in which the thermal imaging camera 100 is positioned and which includes the wall may be heated up, such as by applying a heat source to the room. While the room is heating, the thermal imaging camera 100 may monitor the scene. This monitoring may be intermittent, according to the intermittent processes described herein or other intermittent process, or may be continuous. Because an area of termite damage has different thermal properties than the surrounding area, that portion of the scene may appear distinct from the surrounding area such as the surrounding wall. For example, an area of difference such as a light area or other colored area, may appear in the scene as the room is heating representing a relatively hot spot. This area may correspond to an area of termite damage and may be selectively repaired at a later time, thereby minimizing the amount of reconstruction required. In this way, areas of termite damage may be identified, even when such areas are otherwise invisible inside of a home or building wall, without needing to damage the wall to make a visual inspection within the wall.

Example thermal image cameras and related techniques have been described. The techniques described in this disclosure may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

Various examples have been described. These and other examples are within the scope of the following claims.

The invention claimed is:

1. A method of monitoring a temperature of a scene using a thermal imaging camera comprising:
   a) inputting an amount of a time delay interval into a delay timer of the camera;
   b) capturing an infrared image of the scene, wherein capturing the infrared image triggers the time delay interval to begin, wherein during the time delay interval the camera does not capture an infrared image of the scene;
   c) upon expiration of the time delay interval, capturing another infrared image of the scene, wherein capturing another infrared image triggers the time delay to begin again, wherein during the time delay interval the camera does not capture an infrared image of the scene; and
   d) repeating step c a plurality of times.

2. The method of claim 1, wherein capturing the infrared image further triggers the camera to enter a sleep mode, and wherein the camera stays in sleep mode and does not return to full power until expiration of the time delay interval.

3. The method of claim 2, wherein when the camera is in the sleep mode, power is discontinued to all camera components except the delay timer.

4. The method of claim 1, further comprising inputting a duration of monitoring, wherein step c is repeated until expiration of the duration.

5. The method of claim 1, further comprising storing the infrared images obtained in steps a and c and combining them to form a stream of images.

6. A method of monitoring a temperature of a scene using a thermal imaging camera comprising:
   a) inputting a temperature threshold into the camera;
   b) capturing an infrared image of the scene;
   c) after capturing the infrared image, detecting a thermal energy of the scene without capturing another infrared image;
   d) if the detected thermal energy does not exceed the threshold, continuing to detect the thermal energy of the scene without capturing another infrared image;
   e) if the detected thermal energy exceeds the threshold, capturing another infrared image of the scene;
   f) after capturing another infrared image of the scene, resuming detecting the thermal energy of the scene without capturing another infrared image; and
   g) repeating steps d-f a plurality of times.

7. The method of claim 6, further comprising buffering infrared images of the scene via a frame buffer.

8. The method of claim 7, wherein capturing the infrared image of the scene includes capturing at least some of the infrared images from the frame buffer.

9. The method of claim 8, wherein the at least some of the infrared images from the frame buffer include infrared images of the scene both before and after the detected thermal energy exceeds the threshold.

10. The method of claim 6, wherein capturing the infrared image of the scene includes capturing multiple frames of infrared images.

11. The method of claim 6, wherein while detecting the thermal energy of the scene in steps c and f, the camera is in a sleep mode.

12. The method of claim 11, wherein when the camera is in sleep mode, a supply of power is discontinued to camera components not being used.

13. The method of claim 12, wherein when the camera is in sleep mode, the supply of power is continued to a system on chip of the camera for detecting the thermal energy of the scene.

14. The method of claim 6, further comprising analyzing whether the detected thermal energy exceeds the threshold, where the analysis is performed by mpeg encoder blocks of a system on chip, where the system on chip includes a processor.

15. The method of claim 6, wherein the threshold comprises a temperature value.

16. The method of claim 6, wherein the threshold comprises an amount of a temperature increase.

17. The method of claim 6, further comprising combining the captured infrared images into a stream of images.

18. A method of monitoring a temperature of a scene using a thermal imaging camera comprising:
   a) inputting a temperature threshold into the camera;
   b) inputting an amount of a time delay interval into a delay timer of the camera;
   c) capturing an infrared image of the scene;
   d) starting the delay timer for a time delay interval, wherein capturing the infrared image triggers the delay timer to start the time delay interval, and wherein the camera does not detect thermal energy of the scene or capture another infrared image of the scene during the time delay interval;
   e) upon expiration of the time delay interval, detecting a thermal energy of the scene;
   f) if the detected thermal energy of the scene detected in step e does not exceed the threshold, restarting the delay timer, wherein the camera does not detect thermal energy of the scene or capture another infrared image of the scene during the time delay interval;
   g) if the detected thermal energy exceeds the threshold, capturing another infrared image of the scene, and then restarting the delay timer, wherein the camera does not detect thermal energy of the scene or capture another infrared image of the scene during the time delay interval; and
   h) repeating steps e-g a plurality of times.

19. The method of claim 18, wherein capturing the infrared image in step c or starting the delay timer in step d triggers the camera to enter a sleep mode and wherein capturing another infrared image in step g or restarting the delay timer in step g also triggers the camera to enter a sleep mode.

20. The method of claim 19, wherein step e further comprises returning full power to the camera upon expiration of the time delay interval and prior to detecting the thermal energy of the scene in step e.

21. The method of claim 19, wherein if the detected thermal energy exceeds the threshold in step d, returning full power to the camera prior to capturing another infrared image of the scene.

22. The method of claim 19, further comprising combining the captured images into a stream of images.

* * * * *